United States Patent
Wang et al.

(10) Patent No.: US 10,509,281 B2
(45) Date of Patent: Dec. 17, 2019

(54) DISPLAY PANEL AND DISPLAY DEVICE

(71) Applicants: BOE Technology Group Co., Ltd., Beijing (CN); HEFEI Xinsheng Optoelectronics Technology Co., Ltd., Hefei (CN)

(72) Inventors: Yi Wang, Beijing (CN); Xuebing Jiang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 160 days.

(21) Appl. No.: 15/238,245

(22) Filed: Aug. 16, 2016

(65) Prior Publication Data
US 2017/0242312 A1    Aug. 24, 2017

(30) Foreign Application Priority Data
Feb. 19, 2016  (CN) .......................... 2016 1 0095253

(51) Int. Cl.
G02F 1/1362    (2006.01)
G02F 1/1345    (2006.01)

(52) U.S. Cl.
CPC .... *G02F 1/136204* (2013.01); *G02F 1/13452* (2013.01)

(58) Field of Classification Search
CPC ....................... G02F 1/136204; G02F 1/13452
See application file for complete search history.

(56) References Cited

U.S. PATENT DOCUMENTS

| 2008/0204619 | A1* | 8/2008 | Saitou | G02F 1/136204 349/43 |
| 2012/0257151 | A1* | 10/2012 | Teramoto | G02F 1/133512 349/106 |

FOREIGN PATENT DOCUMENTS

| CN | 103593087 A | 2/2014 |
| CN | 105158937 A | 12/2015 |
| JP | 2010191097 A | 9/2010 |
| KR | 1020100007612 A | 1/2010 |

OTHER PUBLICATIONS

May 3, 2018—(CN) First Office Action Appn 201610095253.0 with English Translation.

* cited by examiner

*Primary Examiner* — Thanh Nhan P Nguyen
(74) *Attorney, Agent, or Firm* — Banner & Witcoff, Ltd.

(57) ABSTRACT

A display panel and a display device are disclosed, the display panel includes an opposed substrate and an array substrate opposite to each other, and a flexible printed circuit. The opposed substrate includes a conductive layer, which is configured for electrostatic prevention, the flexible printed circuit includes a first conductive structure connected to the conductive layer, and the conductive layer is grounded through the first conductive structure.

12 Claims, 3 Drawing Sheets

DISPLAY PANEL AND DISPLAY DEVICE

This application claims priority to and the benefit of Chinese Patent Application No. 201610095253.0 filed on Feb. 19, 2016, which application is incorporated herein in its entirety.

TECHNICAL FIELD

Embodiments of the present disclosure relate to a display panel and a display device.

BACKGROUND

A thin film transistor liquid crystal display device (TFT-LCD) is a display device with small volume, low power consumption, and low radiation. A TFT-LCD comprises an array substrate (TFT substrate), a color filter (CF) substrate, and a liquid crystal layer disposed therebetween.

Because of electrostatic effect, a TFT-LCD panel may accumulate electric charges, which may impact the internal electric field inside the TFT-LCD panel, and therefore, the arrangement of the liquid crystal is affected, and the display effect of the product is adversely impacted; the accumulated electric charges can even result in a series of defects and seriously influence the quality of the product.

SUMMARY

An embodiment of the present disclosure provides a display panel, comprising: an opposed substrate and an array substrate opposite to each other, and a flexible printed circuit. The opposed substrate comprises a conductive layer, which is configured for electrostatic prevention, the flexible printed circuit comprises a first conductive structure connected to the conductive layer, and the conductive layer is grounded through the first conductive structure.

Another embodiment of the present disclosure further provides a display device comprising the above display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
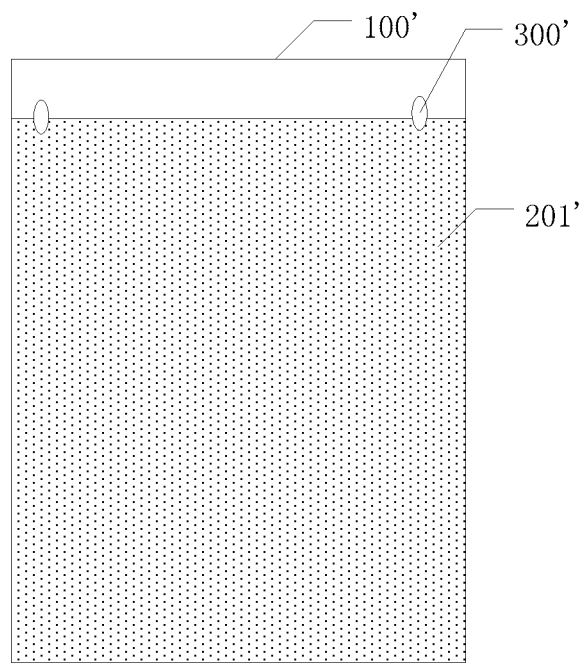
FIG. 1 is a plan view of a display panel.

As illustrated in FIG. 1, the liquid crystal display panel comprises an array substrate and a color filter substrate, which is arranged opposite to each other so that a liquid crystal cell is formed, that is, the array substrate and the color filter substrate are cell-assembled. A conductive layer 201', which is configured for electrostatic prevention, is disposed on the color filter substrate; and after the cell-assemble of the color filter substrate and the array substrate, a conductive adhesive (such as silver adhesive) 300' is coated at the region where the color filter substrate and the array substrate 100' connects with each other; with the conductive adhesive electrically connects the array substrate and the color filter substrate, the electrostatic charges accumulated on the color filter substrate can transfer to the array substrate via the conductive adhesive, and then the electrostatic charges on the array substrate can transfer out via a grounded circuit. However, in the above-mentioned approach, problems such as coating abnormity, oxidation, disconnection of the conductive adhesive, and penetration of the conductive adhesive into the panel may occur, and therefore, the transfer of accumulated electrostatic charges can be adversely affected, the display effect of the product is degraded, and the quality of the products can even be disadvantageously impacted.

An embodiment of the present disclosure provides a display panel, comprising a color filter substrate and an array substrate disposed opposite to each other, and the color filter substrate comprises a conductive layer configured for electrostatic prevention. The display panel further comprises a flexible printed circuit, the flexible printed circuit comprises a first conductive structure, which is connected to the conductive layer, and the conductive layer is grounded via the first conductive structure.

In the display panel provided by an embodiment of the present disclosure, the electrostatic charges accumulated on the color filter substrate and then collected via the conductive layer can be led out via the first conductive structure of the flexible printed circuit; therefore, it is not necessary to provide conductive adhesive (such as silver adhesive) for conducting the electrostatic charges between the color filter substrate and the array substrate, and then it can avoid the undesired effect to the display panel caused by the conductive adhesive, which is configured for conducting the electrostatic charges, between the color filter substrate and the array substrate.

Figure 2:
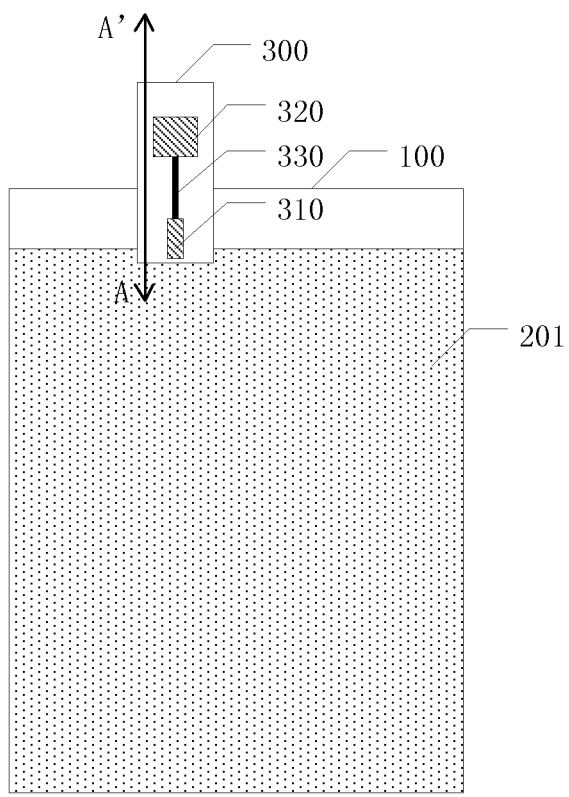
FIG. 2 is a plan view of a display panel provided by an embodiment of the present disclosure.

FIG. 2 is a schematic diagram of a display panel provided by an embodiment of the present disclosure. The display panel comprises a color filter substrate and an array substrate 100 opposite to each other, and a liquid crystal layer is disposed between the color filter substrate and the array substrate 100; the color filter substrate comprises a base substrate, a color filter layer, a black matrix, and a conductive layer 201 configured for electrostatic prevention; the material of the conductive layer 201 can comprises indium tin oxide (ITO). The color filter substrate is an example of the opposed substrate in the display panel.

Figure 5:
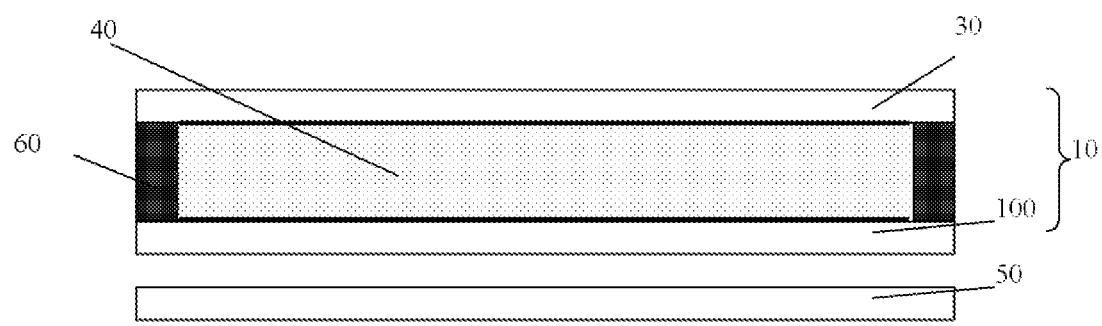
FIG. 5 is a cross-sectional view of the main structure of a display panel provided by an example of the present disclosure.

FIG. 5 is a cross-sectional view of the main structure of a display panel provided by an example of the present disclosure. As illustrated in FIG. 5, in the display panel 10, an array substrate 100 and an opposed substrate 30 are arranged opposite to each other, a liquid crystal cell is formed through a sealant 60, and a liquid crystal material 40 is disposed in the liquid crystal cell. The opposed substrate 30, such as a color filter substrate, comprises a color filter layer; however, when the array substrate 100 comprises the color filter layer, it is not necessary to configure the color filter layer in the opposed substrate, and therefore, the opposed substrate is not the color filter substrate. The pixel electrode of each pixel unit in array substrate 100 are configured for realizing the display operation through applying an electric filed on the liquid crystal material and then controlling the rotation degree of the liquid crystal material. In some examples, the liquid crystal display panel 10 further comprises a backlight 50 configured for providing the light source for display.

The display panel further comprises a flexible printed circuit (FPC) 300, and the flexible printed circuit 300 comprises a first conductive structure which is connected to the conductive layer 201; the conductive layer 201 is grounded via the first conductive structure; the first conductive structure comprises a pin 310 connected to the conductive layer 201 and a ground pad 320, and the pin 310 is electrically connected to the ground pad 320 through a wire 330.

Figure 3:
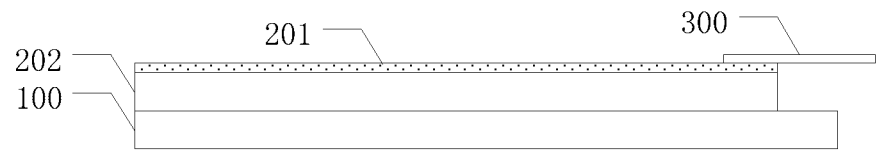
FIG. 3 is a cross-sectional view taken along direction AA' in FIG. 2.

FIG. 3 is a cross-sectional view taken along direction AA' in FIG. 2, the conductive layer 201 is configured at the side, away from the array substrate 100, of the substrate 202 of the color filter substrate; the color filter layer and the black matrix is configured at the side, facing toward the array substrate 100, of the substrate 202; the flexible printed circuit 300 is configured on the conductive layer 201, the electrostatic charges accumulated on the color filter substrate can transfer to ground via the first conductive structure of the flexible printed circuit 300, therefore, the configuration can avoid the undesired effect caused by the electrostatic charges on the color filter substrate.

For example, in order to reduce the fabrication cost, the flexible printed circuit can further comprise a second conductive structure, which is configured for transmitting a driving signal to the array substrate.

For example, the substrate of the flexible printed circuit comprises a main portion, which is connected to the array substrate, and an extension portion, which is located at at least a side of the main portion and connected to the color filter substrate; the first conductive structure is configured on the extension portion.

Figure 4:
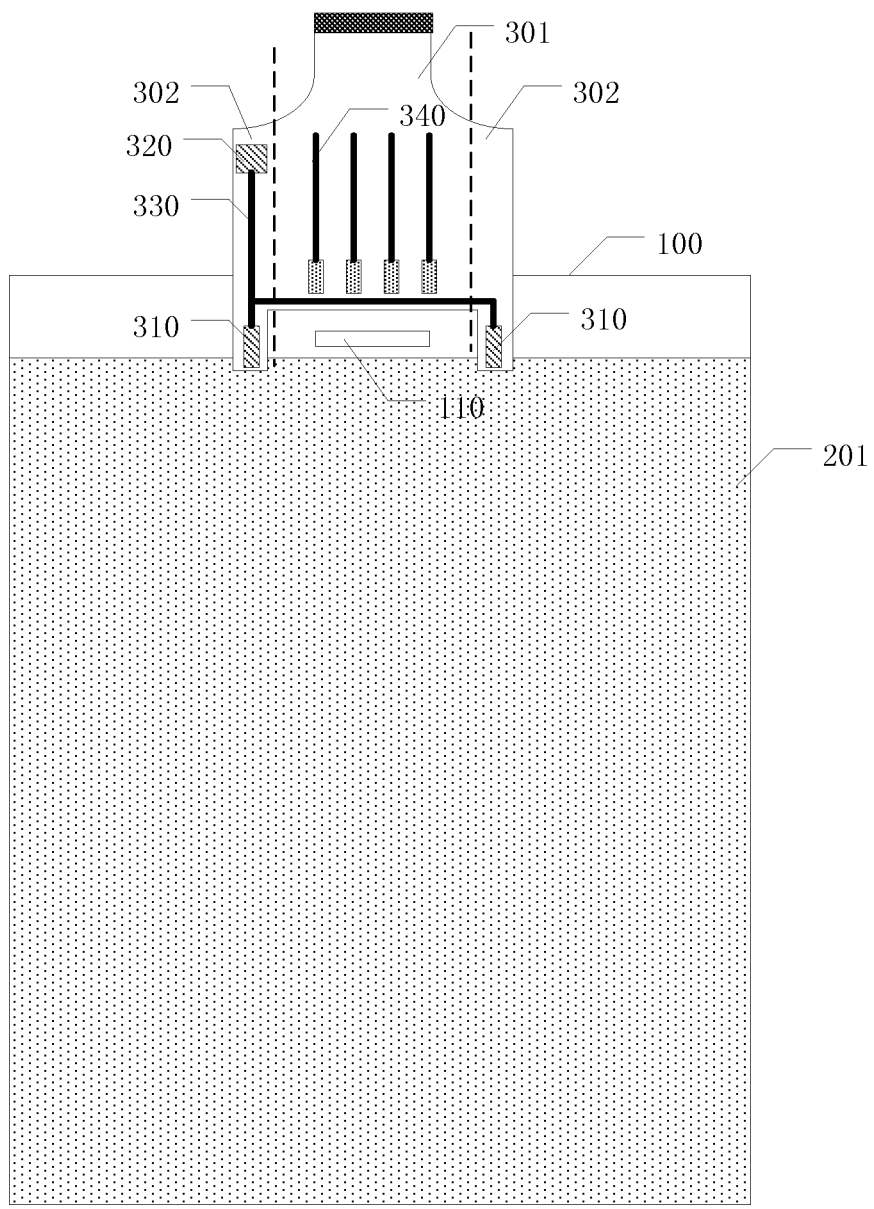
FIG. 4 is a plan view of another display panel provided by an embodiment of the present disclosure.

FIG. 4 is a schematic diagram of another display panel provided by an embodiment of the present disclosure. The display panel comprises a color filter substrate and an array substrate 100 opposite to each other, and a liquid crystal layer is disposed between the color filter substrate and the array substrate 100; the color filter substrate comprises a base substrate, a color filter layer, a black matrix, and a conductive layer 201 configured for electrostatic prevention; the material of the conductive layer 201 can comprise indium tin oxide (ITO). The main structure of the display panel can refer to the schematic diagram of FIG. 5.

The display panel further comprises a flexible printed circuit 300, and the substrate of the flexible printed circuit 300 comprises a main portion 301, which is connected onto the array substrate for example by bonding, and an extension portion 302, which is connected onto the color filter substrate for example by bonding, configured at both sides of the main portion 301.

A second conductive structure 340, which is configured for transmitting a driving signal to the array substrate 100, is arranged at the side, toward the array substrate, of the main portion 301; for example, a driving signal can input into the driving circuit (such as a driving IC) 110 of the array substrate through the second conductive structure 340.

A first conductive structure, which is connected to the conductive layer 201, is arranged at the side, toward the color filter substrate, of the extension portion 302; the first conductive structure comprises a pin 310 connected to the conductive layer 201 and a ground pad 320, and the pin 310 is electrically connected to the ground pad 320 through a wire 330.

For example, for above-mentioned display panel, after a bonding process of the driving IC is conducted, the main portion of the flexible printed circuit can be connected onto the array substrate through a bonding process, and the extension portion is connected onto the color filter substrate as well.

For example, each of the flexible printed circuits can comprise a plurality of above-mentioned pins.

For example, the display panel in the embodiment of the present disclosure can comprises a plurality of above-mentioned flexible printed circuits.

In the display panel provided by the embodiment of the present disclosure, the electrostatic charges on the color filter substrate can be collected via the conductive layer, and can be led out via the first conductive structure of the flexible printed circuit; therefore, it is not necessary to provide silver adhesive for conducting the electrostatic charge between the color filter substrate and the array substrate any more, and then it can avoid the undesired effect caused by coating abnormity, oxidation, disconnection of the conductive adhesive and the penetration of the conductive adhesive into the panel, therefore, the yield and the competitiveness of the product is accordingly improved.

An embodiment of the present disclosure further provides a display device, which comprises the any of above-mentioned display panels. The display device provided by the embodiment of the present disclosure can be any products or device that has display function, such as a display screen of the laptop, a display device, a television, a digital photo frame, a cell phone, and a tablet computer.

What are described above is related to the illustrative embodiments of the disclosure only and not limitative to the scope of the disclosure; the scopes of the disclosure are defined by the accompanying claims.

The application claims priority to the Chinese patent application No. 201610095253.0, filed Feb. 19, 2016, the entire disclosure of which is incorporated herein by reference as part of the present application.

What is claimed is:

1. A display panel, comprising:
    an opposed substrate and an array substrate which are stacked together and disposed opposite to each other; and
    a flexible printed circuit provided on a side of the opposed substrate and the array substrate which are stacked together,
    wherein the opposed substrate comprises a conductive layer, which is configured for electrostatic prevention, the flexible printed circuit comprises a first conductive structure and a second conductive structure, the first conductive structure is electrically connected to the conductive layer from the side, the second conductive structure is electrically connected to the array substrate and configured for transmitting a driving signal to the array substrate, and the conductive layer is grounded through the first conductive structure.

2. The display panel according to claim 1, wherein the flexible printed circuit comprises a base substrate, the base substrate comprises a main portion, which is connected to the array substrate, and an extension portion, which is located at at least a side of the main portion and connected to the opposed substrate; and the second conductive structure is disposed on the main portion, and the first conductive structure is disposed on the extension portion.

3. The display panel according to claim 2, wherein the extension portion is arranged at both sides of the main portion.

4. The display panel according to claim 2, wherein the main portion is disposed on the array substrate, and the extension portion is disposed on the opposed substrate.

5. The display panel according to claim 1, wherein the first conductive structure comprises a pin, which is connected to the conductive layer, and a ground pad, which is coupled to the pin.

6. The display panel according to claim 5, wherein the first conductive structure comprises a plurality of pins.

7. The display panel according to claim 5, wherein the pin is electrically connected to the ground pad through a wire.

8. The display panel according to claim 1, wherein a material of the conductive layer comprises indium tin oxide (ITO).

9. The display panel according to claim 1, wherein the display panel comprises a plurality of flexible printed circuits.

10. The display panel according to claim 1, wherein the opposed substrate is a color filter substrate.

11. A display device, comprising the display panel according to claim 1.

12. A display panel, comprising:
an opposed substrate and an array substrate disposed opposite to each other; and
a flexible printed circuit,
wherein the opposed substrate comprises a conductive layer, which is configured for electrostatic prevention, the flexible printed circuit comprises a first conductive structure connected to the conductive layer and a second conductive structure, which is configured for transmitting a driving signal to the array substrate, and the conductive layer is grounded through the first conductive structure;
the flexible printed circuit comprises a base substrate, the base substrate comprises a main portion, which is bonded to the array substrate, and an extension portion, which is located at at least a side of the main portion and bonded to the opposed substrate; and the second conductive structure is disposed on the main portion, and the first conductive structure is disposed on the extension portion.

* * * * *